(12) United States Patent
Engolia

(10) Patent No.: US 6,273,391 B1
(45) Date of Patent: Aug. 14, 2001

(54) BICYCLE FISHING POLE HOLDER

(76) Inventor: Grady M. Engolia, 1515 Poydras St. Suite 2200, New Orleans, LA (US) 70112

(*) Notice: Subject to any disclaimer, the term of this patent is extended or adjusted under 35 U.S.C. 154(b) by 0 days.

(21) Appl. No.: 09/205,923

(22) Filed: Dec. 1, 1998

Related U.S. Application Data

(63) Continuation-in-part of application No. 08/940,112, filed on Sep. 29, 1997, now abandoned.

(51) Int. Cl.[7] ............................. A01K 97/10; B62J 11/00
(52) U.S. Cl. ...................... 248/539; 248/538; 224/422; 224/434; 224/922
(58) Field of Search ...................... 224/422, 434, 224/433, 922, 32 A, 39; 248/539, 534, 538; 280/288.4; 43/21.2; D22/147, 148

(56) References Cited

U.S. PATENT DOCUMENTS

| | | | |
|---|---|---|---|
| 649,367 | 5/1900 | Seiler | 248/538 |
| 672,495 * | 4/1901 | Smith | 224/422 X |
| 3,167,284 * | 1/1965 | Lynch | 224/422 X |
| 3,309,808 * | 3/1967 | George, Sr. | D22/148 X |
| 3,470,648 * | 10/1969 | Bowker | 248/538 X |
| 3,601,919 * | 8/1971 | Nixon et al. | 43/21.2 |
| 3,722,841 | 3/1973 | Ciolfi | 248/539 |
| 3,744,688 * | 7/1973 | Kezer | 224/433 X |
| 3,825,214 | 7/1974 | Ciolfi | 248/539 |
| 4,046,397 * | 9/1977 | Kitrell | 280/288.4 |
| 4,103,924 | 8/1978 | Suhm | 280/288.4 |
| 4,234,154 | 11/1980 | Walters | 248/539 |
| 4,762,255 * | 8/1988 | Dunn | 224/922 X |
| 4,823,723 * | 4/1989 | Brooks | 248/538 X |
| 4,877,165 * | 10/1989 | Behrle | 224/922 X |
| 4,901,970 * | 2/1990 | Moss et al. | 224/922 X |
| 4,932,152 * | 6/1990 | Barlotta et al. | 43/21.2 |
| 5,052,146 * | 10/1991 | Resnick | 43/21.2 |
| 5,448,402 * | 9/1995 | Lorenzana | 280/288.4 X |
| 5,996,958 * | 12/1999 | Baynard et al. | 248/512 |

\* cited by examiner

*Primary Examiner*—Anita M. King
(74) *Attorney, Agent, or Firm*—Edward D. Markle

(57) ABSTRACT

A bicycle fishing pole holder comprised of a plurality of parallel rings or wire type hoops serially connected to a main shaft aligned to receive a fishing pole handle. The first end of a cylindrical mounting rod is attached to the main shaft and the second end is formed into a half round section designed to be inserted into a universal mounting bracket. The cylindrical mounting rod is bent or angled close to the second end to act as a stop which prevents the rod from completely passing through the mounting bracket The mounting rod is also angled near the first end to position the main shaft vertically and perpendicular to the ground. A universal mounting bracket is comprised of a elongated base with a mounting hole in the first end designed to be bolted to a bicycle axle bolt or other part of the frame; two rectangular projections at the second end attached perpendicular to the base and parallel with each other through which are formed two half rounded holes aligned to accept the second end of the mounting rod. The universal-mounting bracket is attached to the bicycle. The mounting rod which is attached to the fishing pole holder main shaft is inserted into the mounting bracket. The half-rounded design of the mounting rod and bracket mounting rod holes prevents the mounting rod and fishing pole holder main shaft from rotating. The fishing pole handle is inserted into the rings and the reel or the handle projection rests on the upper rim of the first encountered ring.

9 Claims, 4 Drawing Sheets

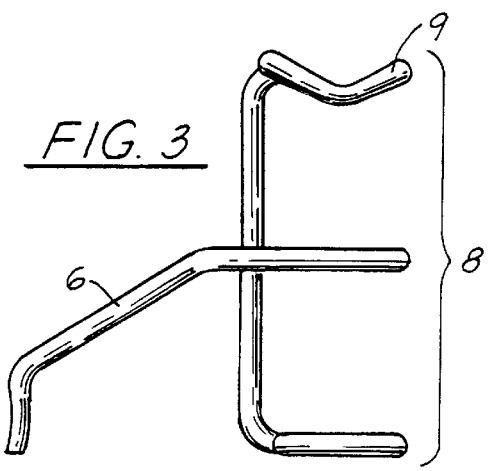
FIG. 4
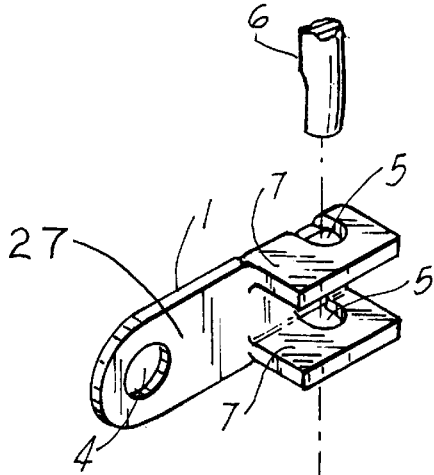
FIG. 3
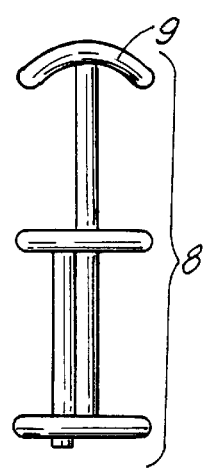
FIG. 5
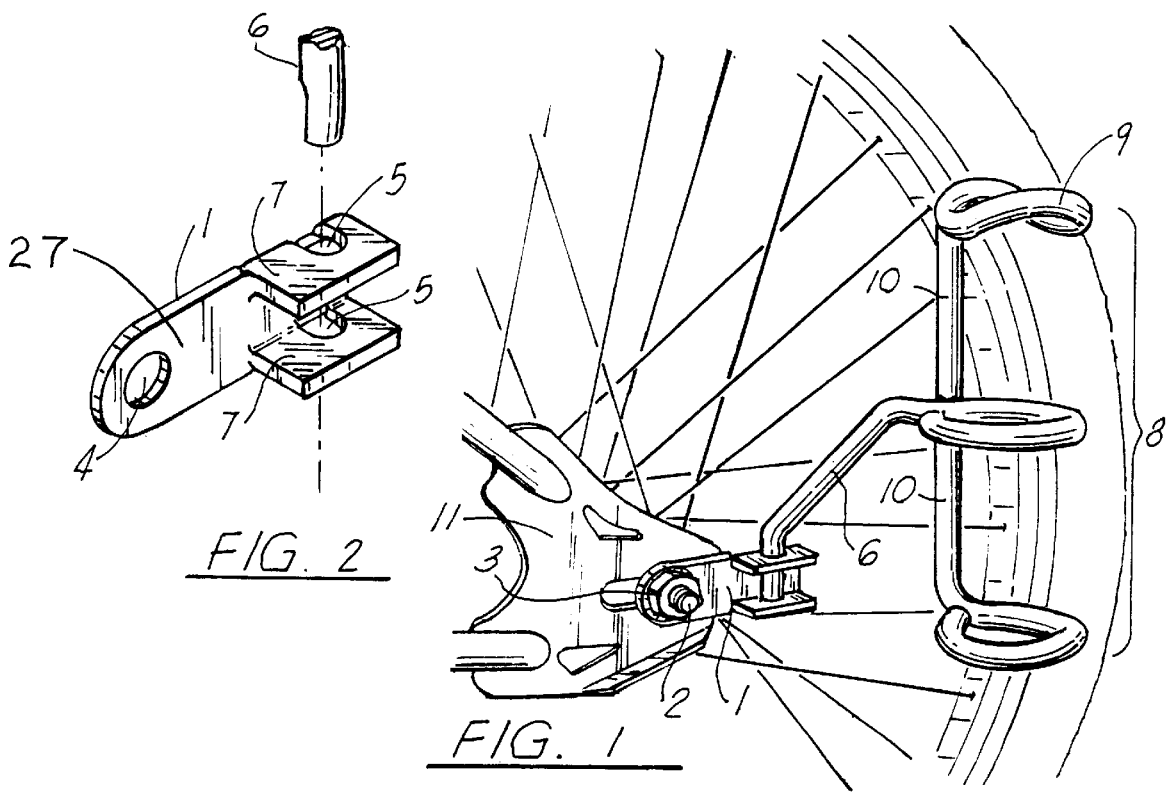
FIG. 2
FIG. 1

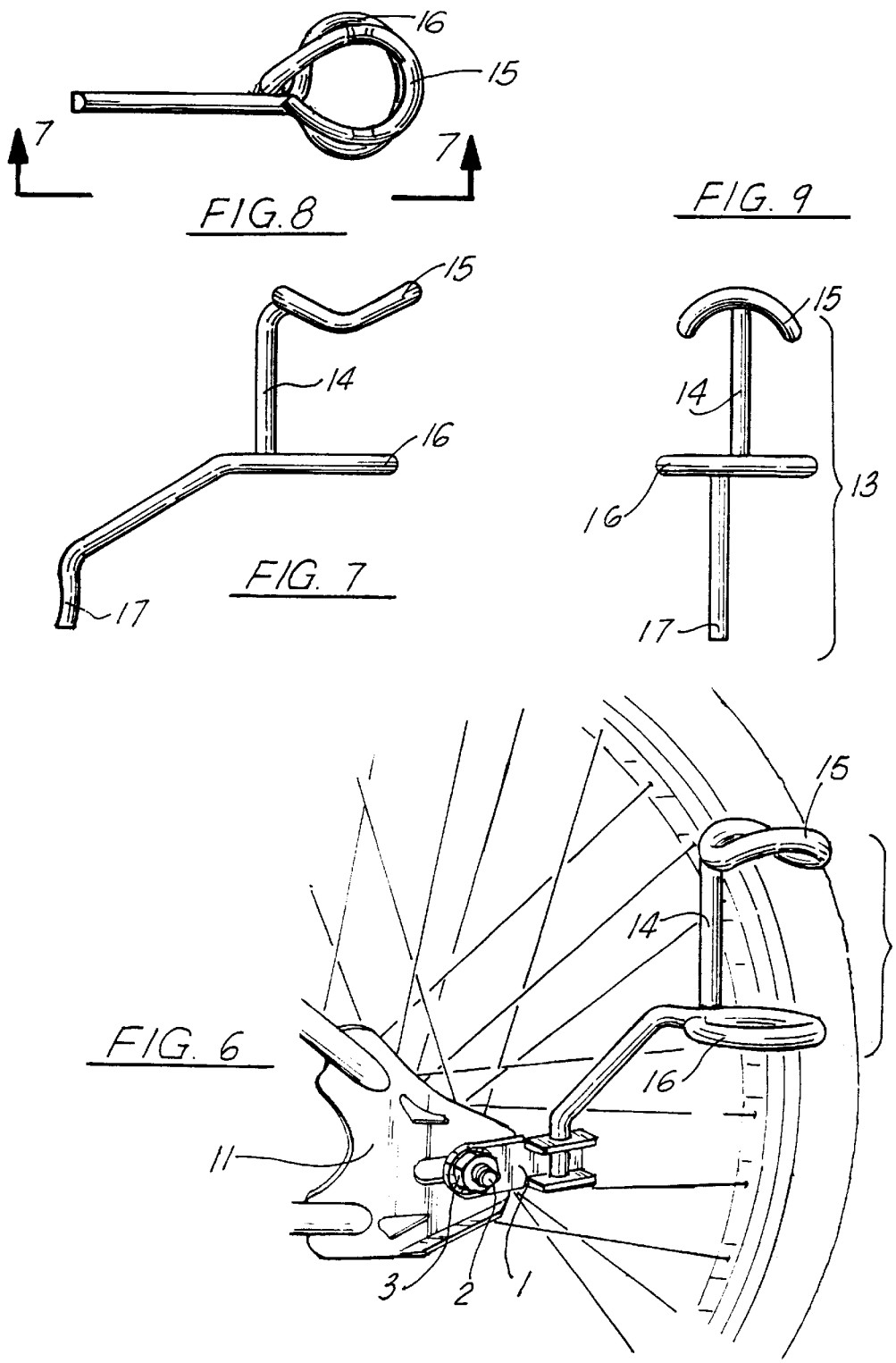

BICYCLE FISHING POLE HOLDER

1. PRIORITY CLAIM STATEMENT

This case is a continuation-in-part of the U.S. non-provisional patent specification filed on Sep. 29, 1997, bearing application Ser. No. 08/940,112 now abandoned.

2. FIELD OF THE INVENTION

The invention is generally related to a bicycle fishing pole holder such that the holder or carrier is attached directly to a wheel, axle and/or frame mounting point of a bicycle or other lightweight vehicle as described in the application.

3. DESCRIPTION OF THE RELATED ART

The prior art discloses various types and designs of fishing pole holders utilized in conjunction with boats, tackle boxes and dock facilities. However, there does not appear to be disclosure of a product providing a fishing pole holder or carrier for movable lightweight vehicles such as bicycles and motorcycles. The subject invention provides a versatile, lightweight product that is designed to carry a typical fishing pole equipped with or without a reel.

Fishing is a very popular sport and the use of the bicycle or motorcycle has become increasingly popular as a means of transportation to fishing locations. There are no known products that allow for the safe and orderly transportation of fishing poles on bicycles and motorcycles. Transporting fishing poles while riding and operating a bicycle can be very difficult, cumbersome and unsafe.

The simplicity of applicant's design allows for securing the fishing pole to a wheel, axle or other frame mounting point on a bicycle by means of a universal mounting bracket attached to a plurality of serially connected rings or wire type hoops designed to receive and hold the fishing rod handle. The rings keep the fishing pole stable in a vertical or near vertical position thus relieving the operator from the task of handling the pole while operating the vehicle. The invention will allow one to transport a fishing pole by a bicycle or motorcycle while not interfering with the operation of the vehicle. The lightweight design is capable of quick and easy attachment and removal. The universal mounting bracket can be adjusted or rotated on the mounting point to allow for different angles of pole mounting thus allowing for obstruction clearances.

4. SUMMARY OF THE INVENTION

There is no known device that provides a means of safely carrying or transporting a fishing pole on a bicycle or motorcycle. This invention is a fishing pole holder or carrier developed for use with bicycles, motorcycles and other lightweight vehicles designed to securely transport a fishing pole without hindering the operation of the vehicle and allow the operator to use both hands for control. The design promotes easy attachment and removal of the pole holding device and also allows for quick and easy insertion and removal of a fishing pole.

This invention comprises a fishing pole holder designed with a plurality of parallel rings or wire type hoops serially connected by a main shaft and aligned to receive the handle of a typical fishing pole. The main shaft with the attached rings is attached to one end of a mounting rod. The opposite end of the mounting rod is formed into a half rounded section designed to be inserted into the universal mounting bracket. The mounting rod has a first angle near the main shaft connection designed to position the main shaft vertically when the rod is inserted into the universal mounting bracket. A second angle located near the half-rounded end is designed into the mounting rod to act as a stop or swivel base when it is inserted into the universal-mounting bracket. A universal mounting bracket is comprised of an elongated flat base; a bracket mounting hole at one end of the base; and two separated, rectangular projections or plates less than half the length of the base attached to the opposite end with each projection parallel to each other and perpendicular to the base. The bracket is attached to the bicycle and is designed to receive the mounting rod. The projections are equipped with half rounded holes in each member aligned to permit the insertion of the half-rounded end of the mounting rod. This design prevents the mounting rod and the pole holder from rotating when it is inserted into the universal mounting bracket but yet allows one to easily remove the pole holder from the bracket which is attached to the bicycle.

The pole holder may also be designed as a tubular sleeve attached to a perpendicular mounting shaft which shaft is attached to the wheel axle or other mounting point of a bicycle by means of a nut or other securing device.

It is an objective of this invention to provide a secure means of safely transporting or carrying a fishing pole on a bicycle or motorcycle so that the pole does not interfere with the safe operation of the bicycle or vehicle.

It is another objective of this invention to provide a new fishing pole holder that is easy to install on a bicycle or motorcycle.

It is a further objective of this invention to provide a fishing pole holder that allows for quick and easy insertion and removal of a fishing pole or rod.

It is also an objective of this invention to provide a fishing pole holder that can be adjusted to allow for different angles of the pole as measured against the vertical position to allow for obstruction clearances.

It is an additional objective of this invention to provide a fishing pole holder having a mounting bracket that can be installed on a variety of bicycles and motorcycles.

Another objective of this invention is to provide a fishing pole holder of simple and efficient design which allows one to place the pole in the holder in a vertical, upright position during transportation or to adjust its angle to allow for obstruction clearance.

5. BRIEF DESCRIPTION OF THE DRAWINGS

For a further understanding of the nature and objectives of the present invention, reference should be made to the following detailed description taken in conjunction with the accompanying drawings in which like parts are given like reference numerals, and wherein:

FIG. 1 is an isometric view of a preferred embodiment of the invention as it may be attached to the rear attachment point of a bicycle wheel frame. Note that this particular design incorporates three separated parallel rings or hoops serially connected by a main shaft and aligned to permit the insertion of a fishing pole handle. The figure also depicts the universal-mounting bracket.

FIG. 2 is an isometric view of a universal mounting bracket utilized to attach the fishing pole holder to the rear portion of a bicycle or motorcycle wheel frame. Note that the bracket can be rotated clockwise or counterclockwise about the attachment point to provide for different angles of fishing pole transportation. Also note that the tip or end of the mounting rod is designed with a half rounded end that fits snugly into two serially aligned half rounded holes on the mounting bracket. This design prevents the mounting rod and the pole holder from rotating but yet allows one to easily remove the holder from the bracket which is attached to the bicycle.

FIG. 3 is a side view of a fishing pole holder with the upper most rim employing a concave resting area or rim used to help stabilize a fishing pole during transportation.

FIG. 4 is a top view of the fishing pole holder illustrated in FIG. 3.

FIG. 5 is a front view of the fishing pole holder illustrated in FIG. 3.

FIG. 6 is an isometric view of the an alternate design as it may be attached to the rear of a bicycle wheel frame. Note that this particular design incorporates two serially connected parallel rings or wire type hoops as the fishing pole holder with the upper rim being somewhat concave allowing for pole stability. The figure also depicts the universal-mounting bracket that can be rotated about its attachment point to vary the angle of transportation of the pole.

FIG. 7 is a side view of a fishing pole holder incorporating two serially connected parallel rings with the top rim employing a concave resting area used to help stabilize a fishing pole during transportation.

FIG. 8 is a top view of the fishing pole holder illustrated in FIG. 7. Please note that the bottom ring may be elongated or oval to permit better stability or to receive a different type of fishing pole handle.

FIG. 9 is a front view of the fishing pole holder illustrated in FIG. 7.

Figure 10:
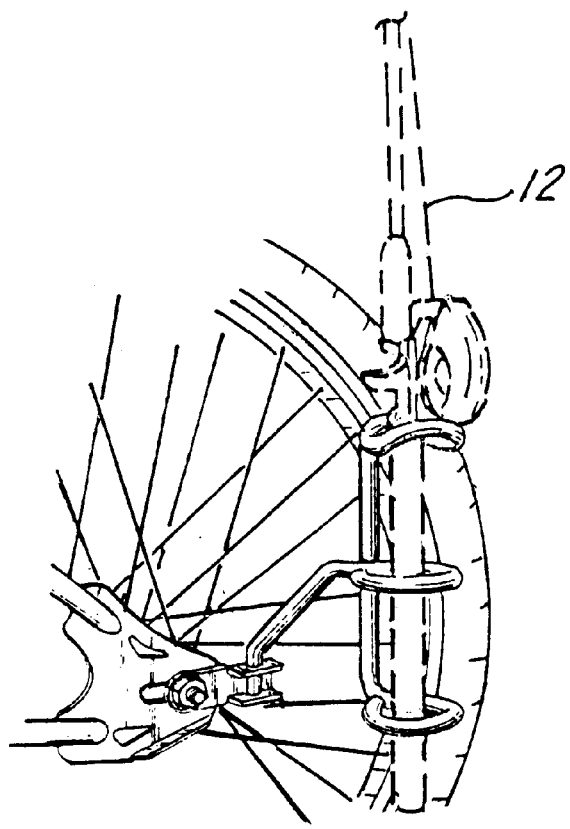

FIG. 10 is an isometric view of the invention attached to the rear of a bicycle and depicting a fishing pole mounted in the three ring holder.

Figure 11:
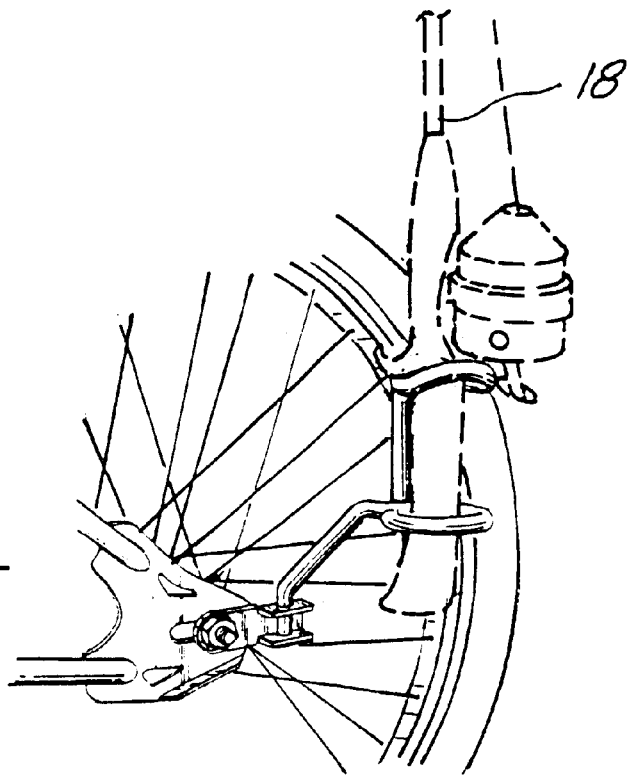

FIG. 11 is an isometric view of the invention attached to the rear of a bicycle and depicting a fishing pole mounted in the two ring holder.

Figure 12:
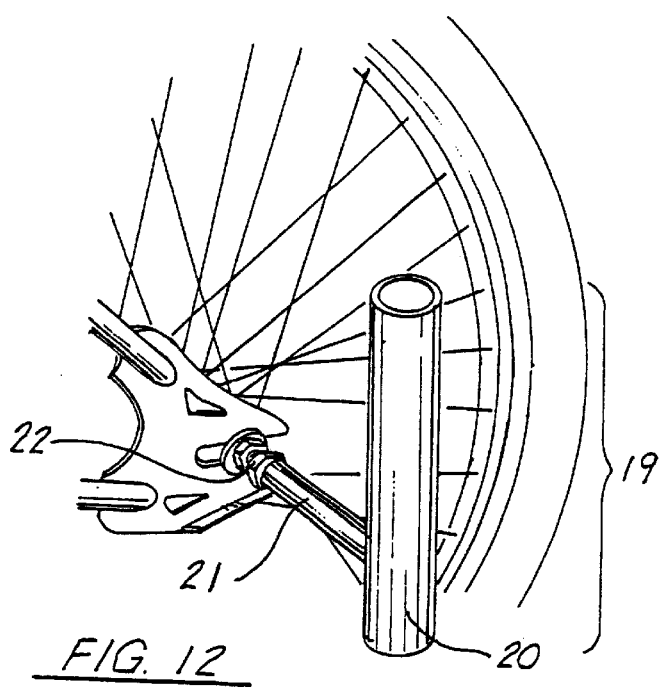

FIG. 12 is an isometric view of an alternate design of the invention employing a tubular sleeve as the fishing pole holder. One end of a mounting shaft is attached to the tubular sleeve and the other end is attached to a mounting nut which attaches or screws onto the rear axle bolt of a bicycle.

Figure 13:
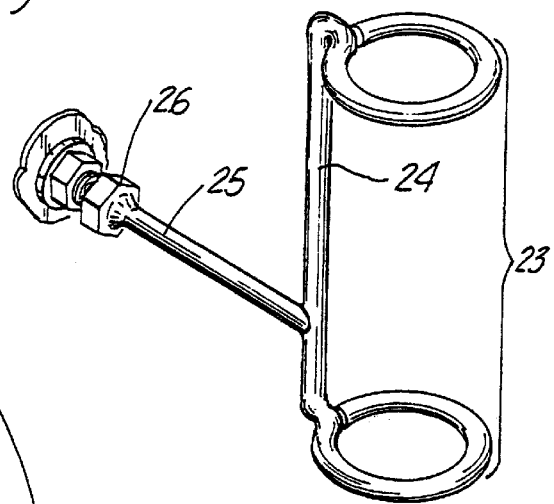

FIG. 13 is an isometric view of yet another design incorporating a two ring fishing pole holder to which is attached a perpendicular shaft that bolts to the rear axle bolt of a bicycle. Note that the upper ring does not utilize a concave type design.

Figure 14:
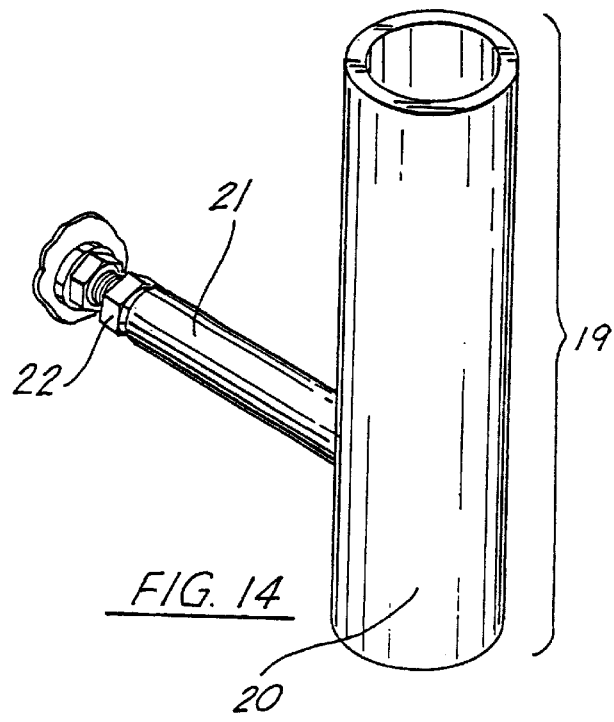

FIG. 14 is an isometric view of the embodiment illustrated in FIG. 12.

DETAILED DESCRIPTION OF THE PREFERRED EMBODIMENTS

FIG. 1 discloses a first embodiment of a three-ring bicycle fishing pole holder 8 generally comprised of an elongated main shaft 10, parallel rings 9, a cylindrical mounting rod 6, and a universal mounting bracket 1. The fishing pole holder 8 is comprised of an elongated main shaft 10 with a first end, a second end and a middle section. As shown in FIG. 1, three parallel rings 9 are serially arranged and connected perpendicularly to the elongated main shaft 10, which rings are aligned to permit the insertion of a handle of a fishing pole through said rings allowing a reel which is attached to the fishing pole to rest on the first ring. A second ring is attached to the middle section of the elongated main shaft and a third ring is attached to the second end of the elongated main shaft. The rings can be manufactured by bending or forming a single rod into a ring at one end or the rings can be manufactured by looping a small rod into a ring shape, which ring can then be attached to an elongated main shaft.

A cylindrical mounting rod 6 has a first end attached perpendicularly to any point along the length of the elongated main shaft and a second end formed into a half rounded section which is designed to fit into half rounded mounting rod bracket holes 5 designed in the universal mounting bracket 1. The preferred embodiment shows the cylindrical mounting rod 6 attached to the middle section of the elongated main shaft. FIG. 1 also discloses that the cylindrical mounting rod 6 and the ring 9 is formed from a single rod of material with the first end being bent or formed into a ring and the second end being formed into a half round section for insertion into the half rounded mounting rod bracket holes 5 designed in the universal mounting bracket 1.

The universal-mounting bracket 1 is attached to the bicycle's rear axle frame 11 by inserting the bicycle rear axle bolt 2 through the bracket mounting hole 4 and then securing it by the wheel axle nut 3. The universal-mounting bracket I can be rotated clockwise or counterclockwise to vary the angle of the pole holder 8 and thereby adjusting the angle of the fishing pole to allow for obstruction clearance.

The universal mounting bracket 1 may be attached to any desired member or part of the frame of the bicycle, such as the rear axle frame 11 and such as a fender support or frame strut, preferably at the rear of the bicycle in order to avoid interference with the normal operation of the vehicle. As shown, the device is detachably mounted at the rear axle position. It is to be understood that the device may be employed in other types of vehicles such as motorcycles, scooters and other types of lightweight vehicles.

The fishing pole holder 8 is comprised of parallel rings or wire type hoops 9 serially connected by a main shaft 10; said rings being aligned to allow for the insertion of a fishing pole handle through all rings. The main shaft rings can be made of any strong, light-weight metal or plastic substance. If metal is utilized, the rings and shaft can be formed by bending one or more rods, by casting or by a welding process or a combination thereof. If a plastic substance is utilized, a molding process may be employed.

The upper ring 9 of the pole holder 8 can be manufactured with a concave type design to allow for greater stability of the fishing pole. The reel or projected handle of a fishing pole 12 rests on the upper ring 9 as shown in FIG. 10. The pole holder 8 may be attached to the mounting rod 6 by a welding or cementing process or the mounting rod may be formed by bending a metal cylindrical rod into a ring at one end and machining or otherwise creating a half round tip at the opposite end. The mounting rod 6 with a ring at one end could then be welded, cemented or otherwise connected to the main shaft 10, aligning the rings to permit the insertion of the fishing pole handle through the rings. The mounting rod 6 is formed or bent at an angle to allow the pole holder 8 to keep the fishing pole in a vertical position when the rod's handle is inserted through the rings.

FIG. 2 illustrates the universal-mounting bracket 1 which can be machined from a strong, light weight metal or molded from a strong plastic substance. The universal mounting bracket 1 is comprised of an elongated base 27 with a bracket mounting hole 4 at a first end and at a second end, two rectangular plates 7 projecting perpendicular to the elongated base and parallel to each other. The rectangular plates 7 are less than half the length of the elongated rectangular base 27. A half round mounting rod bracket hole 5 is machined or otherwise formed in each rectangular plate 7. The half-round mounting rod bracket holes 5 are serially aligned to accept the second end of mounting rod 6. The tip of the mounting rod 6 is machined or otherwise formed into a half round so that it can be inserted into the half rounded mounting rod bracket holes 5. Shortly above the half-rounded end, the mounting rod 6 is angled to prevent it from traveling its entire length through the half rounded mounting rod bracket holes 5. This angle acts as a stop or base of the mounting rod. The end of the mounting bracket 1 nearest the bracket mounting hole 4 may be rounded as shown in FIG. 2, but rounding is not necessary or critical to the invention.

FIG. 3 and 5 illustrate the use of an upper concave ring 9 designed to maintain the stability of the fishing pole when the handle is inserted through the rings. A concave design need not be employed if rod stability is not critical or a consideration.

The universal mounting bracket 1 may be rotated about the bracket mounting hole 4 to vary the angle of the pole holder 8 thereby altering the angle of the fishing pole for obstruction clearances.

FIG. 6 illustrates an alternative design which incorporates a two ring pole holder 13 with an upper ring 15 employing the concave ring design allowing for better stability of the fishing pole during transportation. The two parallel rings, 15 and 16, are serially connected by a main shaft 14, aligned to permit the insertion of a handle of a fishing pole. The fishing pole 18 rests on the upper ring 15 as shown in FIG. 11. The mounting rod 17 and its tip is similarly designed as mounting rod 6. The lower ring 16 may be oval or elongated to accommodate a different type of fishing pole handle and to provide for better stability during transportation FIG. 12 provides yet another design of a device comprised of an elongated tube 20 of sufficient length and diameter to accept a handle from a typical fishing pole. This design is generally depicted by the numeral 19. The tube 20 may be made of a strong light weight metal or of a plastic substance. The projected handle or reel of the fishing pole rests on the upper rim of the tube 20. A mounting shaft 21 is perpendicularly attached to one end of the tube and may be positioned at any point along the length of the tube but clearance between the bottom end of the tube and the ground must be assured. The opposite end of the mounting shaft 21 is equipped with a mounting nut 22. The mounting nut 22 can be screwed unto the rear bicycle axle bolt 2. It should be understood that FIG. 12 and 14 shows the tubular design 19 attached to the rear axle bolt of a bicycle but the mounting nut 22 could be attached or screwed onto any bolt located on the frame of the vehicle.

FIG. 13 illustrates another design incorporating a plurality of parallel rings serially connected by a shaft 24 and aligned to permit the insertion of a fishing pole handle through the rings. The pole's projected handle or the reel rests on the upper ring. The design is generally depicted by the numeral 23. One end of a mounting rod 25 is attached at any point along the length of the main shaft 24. The rings must be of sufficient diameter to accept a typical fishing pole handle. Further, the distance between the rings must allow for stability of the fishing pole. The other end of the mounting rod is equipped with a mounting nut 26 that attaches or screws to a bicycle axle bolt 2.

Because many varying and differing embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A bicycle fishing pole holder, comprising:
   a. an elongated main shaft with a first end, a second end and a middle section,
   b. a plurality of parallel rings serially arranged and connected perpendicularly to the elongated main shaft, wherein the rings are aligned to permit the insertion of a handle of a fishing pole through said rings allowing a reel which is attached to the fishing pole to rest on a first encountered ring which is attached to the first end of the elongated main shaft,
   c. a universal mounting bracket comprised of: (1) an elongated rectangular base member comprised of a first half rounded end, a second end, and a third and fourth end with the third and fourth ends equal in length and longer than the second end (2) a bracket mounting hole defined in the first half rounded end, (3) a plurality of rectangular plates less than half the size of the elongated rectangular base member attached perpendicularly to the second end of the elongated rectangular base member and aligned parallel to each other and parallel to the third and fourth ends, (4) a half rounded mounting rod bracket hole defined in each rectangular plate with each of said half rounded mounting rod bracket holes being serially aligned,
   d. a cylindrical mounting rod with a first end attached perpendicularly to any point along the length of the elongated main shaft and a second end formed into a half rounded section which is designed to fit into the half rounded mounting rod bracket holes; said mounting rod having a first angle near the second end to act as a stop which prevents the cylindrical mounting rod from completely passing through the half rounded mounting rod bracket holes; said cylindrical mounting rod having a second angle near the first end causing the elongated main shaft to be aligned parallel to the second end of the cylindrical mounting rod and perpendicular to the first end of the cylindrical mounting rod when the cylindrical mounting rod is attached to the elongated main shaft.

2. The bicycle fishing pole holder of claim 1, wherein the first ring is attached perpendicularly to the first end of the elongated main shaft and the second ring is attached perpendicularly to the middle section of the elongated main shaft and the third ring is attached perpendicularly to the second end of the elongated main shaft; said rings being serially aligned to permit the insertion of the handle of the fishing pole.

3. The bicycle fishing pole holder of claim 2, wherein the first ring is of concave design.

4. The bicycle fishing pole holder of claim 2, wherein one or more rings are oval.

5. The bicycle fishing pole holder of claim 1, wherein the first ring is attached perpendicularly to the first end of the elongated main shaft and the second ring is attached perpendicularly to the second end of the elongated main shaft; said rings being serially aligned to permit the insertion of the handle of the fishing pole.

6. The bicycle fishing pole holder of claim 5, wherein the first ring is of concave design.

7. The bicycle fishing pole holder of claim 5, wherein one or more rings are oval.

8. The bicycle fishing pole holder of claim 1, wherein the first ring is of concave design.

9. The bicycle fishing pole holder of claim 1, wherein one or more rings are oval.

* * * * *